United States Patent [19]
Fowler

[11] Patent Number: 5,892,691
[45] Date of Patent: Apr. 6, 1999

[54] METHOD, APPARATUS, AND SOFTWARE PRODUCT FOR GENERATING WEIGHTED DEFORMATIONS FOR GEOMETRIC MODELS

[75] Inventor: Barry M. Fowler, Santa Cruz, Calif.

[73] Assignee: Reel/Frame 8218/0138 Pacific Data Images, Inc., Palo Alto, Calif.

[21] Appl. No.: 740,160

[22] Filed: Oct. 28, 1996

[51] Int. Cl.$^6$ .............................. G06K 9/36; G06K 9/52
[52] U.S. Cl. ........................................... 364/578; 345/433
[58] Field of Search ................................. 395/500, 125, 395/127, 133, 135–160, 161; 364/578, 474.05, 474.24; 345/433, 473, 419

[56] References Cited

U.S. PATENT DOCUMENTS

| 5,353,392 | 10/1994 | Luquet et al. | 395/135 |
| 5,537,523 | 7/1996 | Harashima et al. | 395/140 |
| 5,559,901 | 9/1996 | Lobregt | 382/256 |

OTHER PUBLICATIONS

"Softimage®l3D, A Comprehensive User's Guide", Softimage, Inc., pp. 4–1, 4–21 to 4–23, 4–105 to 4–113m, (1995).
"Learning Alias, Level One", Alias I Wavefront, Inc., pp. 337–339 (1995).

Guillermo Sapiro, "Vector–Valued Active Contours", IEEE, 1996, pp. 680–685.

*Primary Examiner*—Kevin J. Teska
*Assistant Examiner*—Thai Phan
*Attorney, Agent, or Firm*—Fenwick & West LLP

[57] ABSTRACT

A method, apparatus, and software product generates deformation weights for application of a deformation function on a geometric model. The user, working directly on the points of the geometric model, including its surface, defines a deformation area having a focal region fully affected by the deformation and a falloff region only partially affected by the deformation. Deformation weights are then automatically calculated for all points in the regions affected by the deformation, using a technique that creates a smooth and natural decrease in weights from the focal region to the falloff region. Several options are available to the user to control and monitor deformation weight calculations and weighted blending, and to visualize the deformation weights themselves.

17 Claims, 8 Drawing Sheets

METHOD, APPARATUS, AND SOFTWARE PRODUCT FOR GENERATING WEIGHTED DEFORMATIONS FOR GEOMETRIC MODELS

BACKGROUND

1. Field of the Invention

The present invention relates generally to methods, apparatus, and software products for processing images, and more particularly to computer implemented methods and software products for generating weighted deformations for three-dimensional geometric models.

2. Description of the Background Art

In computer graphics technology, a three-dimensional geometric model is a self-contained object or entity that can be represented by a connected set of points. A geometric model can be a simple structure such as a cube or sphere, or can be something much more complex, such as an animal's body. A deformation to a geometric model is any process that displaces some set of or all of the points in the model, which happens when parts of the model are moved, pulled, or stretched. A special deformation "control" is used to guide the direction of a deformation, and these controls are placed on the geometric model during the model creation process. For example, if the model is complex enough to have a substructure or skeleton, a model designer may associate deformation controls with the model's skeletal joints and other places (such as on muscle masses). There are several types of conventional deformation controls, for example, matrices, curves, and deformation lattices, and the types used in a geometric model depend on the modeling software and hardware employed, the characteristics of the geometric model, and the model designer's preferences.

After the substructure of the model is completed, how the surface, or "skin," of the model reacts to the deformations is defined in order to animate the motion of the model through space. Because the surface of the model is what is seen in the animation, correct and realistic deformation of the surface is desirable.

Generally, to deform a model, the designer has to specify the influence of a given deformation on the model, that is, which points on the model are affected by the deformation control and by how much. This specification is known as a "weighted deformation." For example, a point with a deformation weight of 100% for a deformation responds fully to that deformation, and a point that responds only partially to a deformation has a deformation weight of less than 100% for that deformation. When an area of the model is influenced by multiple deformation controls, a "weighted blending" process occurs to combine the effects of the different deformations to the same area. This use of weights for deformations and blending is well known to practitioners of computer graphics.

Most commercially available computer modeling systems have techniques to generate weighted deformations and to blend the effects of multiple deformations on a model. However, a major drawback to the existing techniques is that they are unsophisticated and inaccurate, and too often result in deformation weights that do not realistically simulate how the skin or surface of a structure would deform in a real object. To correct this problem, weights for individual points are typically edited by hand. This editing process is very tedious and resource intensive (in terms of time and human labor), particularly for models having hundreds, and frequently thousands of points subject to the deformation, each of which must be individually weighted.

The most common technique to generate weighted deformations, and used by currently available computer modeling systems, requires the model designer to work with three-dimensional volumes known as "primitives." A primitive is often a sphere, ellipse, box, or capsule, and the designer assigns a primitive to the set of points on the model affected by a deformation by enclosing the set of points within the volume. Deformation weights for points in the volume are based on each point's location within the volume of the primitive, and are defined by the shape of the volume.

One problem with this technique is that the designer often spends a significant amount of time orienting the primitives around the geometric model; a given model, such as a model of a person, may have hundreds of such primitives associated with it. Placement of the primitive is critical for realistic deformation, particularly in small areas such as the eyelids and lips, where improper deformation is easily detected by viewers. Thus, conventional volumetric primitives still require considerable labor for precise adjustment and control over the surfaces contained within the primitive.

A more significant problem with this technique is that the deformation weights the primitive assigns are often undesirable and do not result in smooth decreases in the deformation across the surface of the affected area on the model. This is usually because of the limitations on the shape of a primitive, as it cannot always reflect the actual shape and surface variations of the portion of the model it encompasses. For example, the weighted deformations desired for an oddly shaped figure may not match any of the primitive shapes available. Moreover, because primitives are three-dimensional volumes, they do not act directly upon the surfaces where the deformation is most desired. As a result, conventional primitives often fail to generate the desired deformation weights along complex surfaces, such as a surface with intricate folds, because the deformation weights are assigned through a space defined by the primitive instead of along the folded surface of the model or a space defined by the model itself. As an example, on a geometric model of a flat disk, suppose the designer wants to create a weighted deformation so that the deformation area is strongest in the center of one side of the disk, declines for points going toward the edge of the disk, the edge itself, and points moving away from the edge on the opposite side of the disk, and finally is the weakest at the center point on the opposite side. A three-dimensional primitive, such as a cylinder, cannot be used to generate this type of weighted deformation because it cannot account for decreases in the deformation weight across the surface of the disk, only through the volume of the primitive itself.

Because the shortcomings of existing weighted deformation generation techniques typically result in the assignment of undesirable deformation weights to the points in the area assigned to a deformation, it is often necessary for the designer to manually edit the weights of individual points to create the desired effect on the geometric model's surface. As noted, this process can be very time consuming and thereby can considerably add to the production cost of an animation.

Accordingly, there is a need for an improved method for generating weighted deformations on surfaces that overcomes the disadvantages of the conventional techniques. Because the need for generating accurate weighted deformations to geometric models is commonly experienced in the computer graphics industry, it is desirable to provide a software product that can be applied directly to these models and requires minimal operator intervention, without the need to modify existing modeling tools.

SUMMARY OF INVENTION

In accordance with the present invention, methods, apparatus, and software products are provided to generate weighted deformations for a computer-generated three-dimensional geometric model allowing precise control over surface deformations, regardless of the surface complexity. The present invention is used in conjunction with a digital computer with graphics display to view the geometric model, to input a deformation area on the model, to compute deformation weights of points in the deformation area, to graphically display the deformation weights, and to allow the model designer to control and monitor the entire weighted deformation generation process.

In one embodiment of the present invention, an interactive software product is used with the geometric model to generate the weighted deformations. The geometric model is imported into the software product, and the model designer specifies, directly on the model, what the effects of the deformations will be. The software product determines the weights for the deformation and outputs them for display.

For a given deformation on the model, the model designer defines a deformation area on the model. For some types of models, the deformation area is defined on the surface of the model; in other types of model the deformation area is defined on non-surface points, such as spline curve control points which form a portion of the model definition. To define the deformation area the designer preferably marks two regions to generate the weighted deformation: a focal region, which responds fully to the deformation (that is, points in the focal region all have deformation weights of 100% for that deformation), and a falloff region, which responds only partially to the deformation (that is, points in the falloff region have deformation weights of less than 100% for that deformation). Outside the focal and falloff regions is an unaffected region that is not influenced by the deformation (that is, points in the unaffected region act as if the deformation weight is 0%). There are no restrictions on the sizes, locations, numbers, or shapes of the focal and falloff regions, but the focal region is usually adjacent to or within the falloff region. The falloff region is therefore delimited from the focal region by a set of points (or focal boundary) in the focal region and by a set of points (or falloff boundary) bordering the unaffected region. If either boundary is absent, or both sets of points are absent, their locations may be inferred.

After the focal and falloff regions for a deformation are input on the model, the deformation weights are calculated for points in the falloff region quickly and efficiently. The deformation weight for a point in the falloff region is a function of the point's distance to both the focal boundary of the focal region and falloff boundary of the unaffected region. The function may be a linear, polynomial, or other function of these distances. These distances are either surface distances or spatial distances. A surface distance is the distance between two points measured across the surface of the model, and thereby following any folds or other surface variations. A spatial distance is a distance measured as the shortest path between two points through an n-dimensional space, or in the case of a three dimensional model, a straight line between the two points, through or over the surface of the model. The surface distance measure allows accurate modeling of complex, irregularly shaped or folded surfaces; the spatial distance provides for computational efficiency and close approximation of surface distance for surfaces with small amounts of curvature.

In one embodiment, the deformation weight for a point in the falloff region is a function of its distance to a closest point on the falloff boundary, and its distance to a separate closest point on the focal boundary. The closest point may be a point of the model that lies on the boundary, or a computed point between two points of the model lying on the boundary. Generally, a deformation weight for a point is a function of the ratio of the distance between the point and the falloff boundary to the sum of the distances between the point and the falloff and focal boundaries. This makes deformation weights of points in the falloff region highest by the focal region and lowest by the unaffected region. This results in a smooth decrease in deformation weights for points from the focal region through the falloff region down to the unaffected region.

To monitor the results of the weighted deformation, several options are provided for the designer to view the magnitudes of the deformation weights of points in the deformation area on the model, along with the location of the focal region and falloff regions. These regions may be viewed as solid shadings; alternatively, they may be viewed with variant shading indicating the deformation weight at each point in the regions. In addition, special display options are used when more than one deformation affects the same area on the model.

The model designer reviews the output to verify that the generated weighted deformations behave as desired. The designer may then beneficially control the distance measurement and the blending technique, or make modifications to the focal and falloff regions for a deformation.

Because the deformation weights are specified with respect to a deformation area on the model using the falloff and focal regions, the resulting deformations can be accurately controlled for any type of deformation, avoiding the problems associated with volumetric primitives. Further, because the deformations are defined using basically two regions and a function, large areas of the model can be quickly and easily deformed, without the need to individually, manually edit many points. Thus, the present invention quickly and interactively generates weighted deformations for a geometric model that are smooth and realistic, diminishing the need to edit by hand the deformation weights of individual points. The present invention thereby provides a method and software product that can be applied to geometric models to produce weighted deformations thereof suitable for use in computer graphics modeling, rendering, and animation, through a substantially automated and economical process.

DETAILED DESCRIPTION OF THE INVENTION

Figure 1:
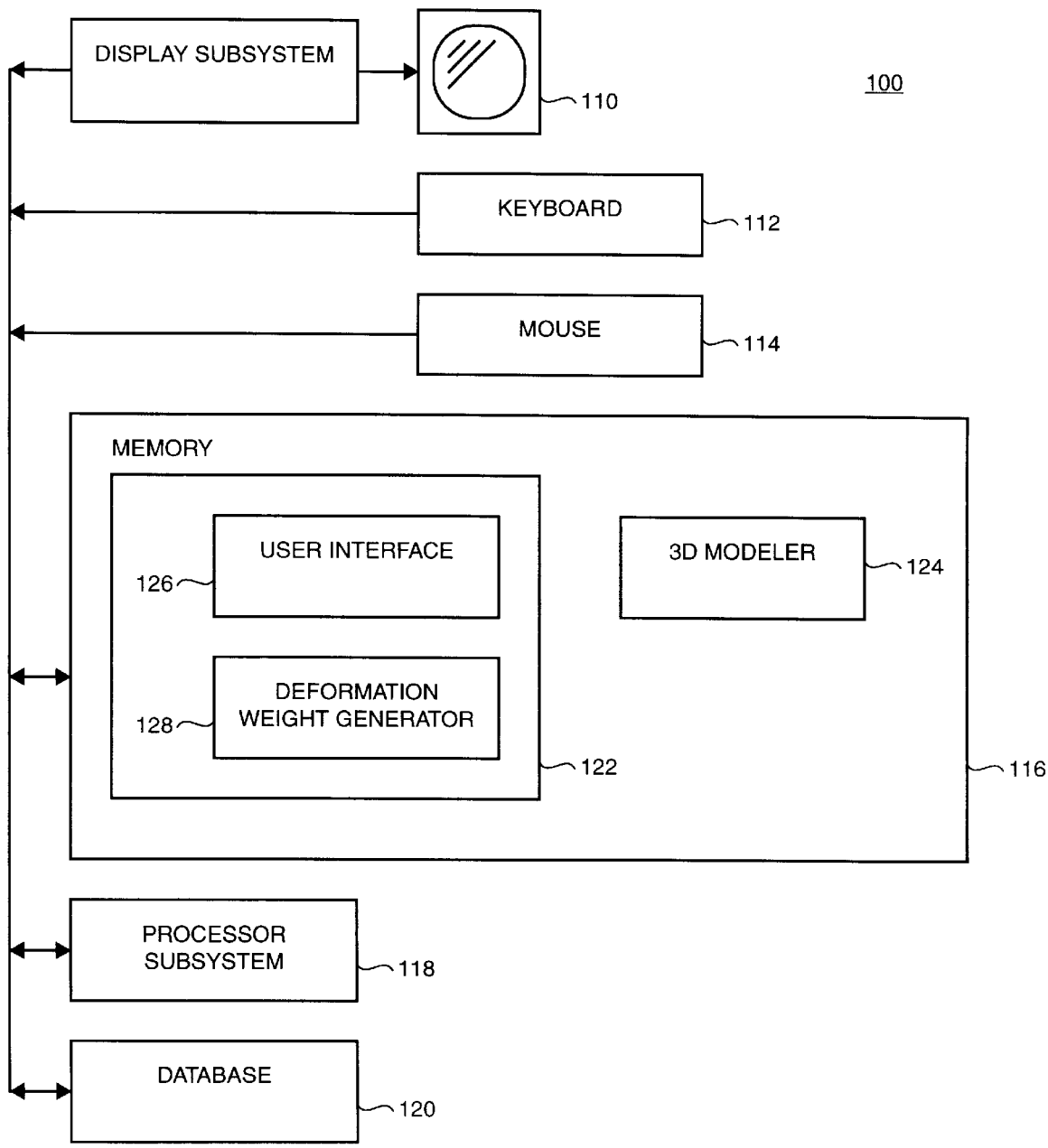
FIG. 1 is a block diagram of an apparatus in accordance with an embodiment of the invention, and which can be used to practice the method of the present invention.

Referring to FIG. 1 there is shown a block diagram of an apparatus 100 in accordance with one embodiment of the present invention, and which can be used to practice the method of the present invention. Apparatus 100 comprises a computer system including a processor 118, a memory 116, input devices such as a keyboard 112 and mouse 114, and output devices such as a raster display 110. The processor 118 and overall apparatus 100 operates under the control of software installed in memory 116. Database storage 120 stores geometric model and data defining deformation weights for the model. The display device 110 is used to monitor input and control of the process, and to view geometric models and the deformation weights of points in the geometric model.

Memory 116 includes a software product 122 for producing smooth weighted deformations in accordance with one embodiment of the present invention. In one embodiment, the software product 122 includes the user interface 126 and a deformation weight generator 128. The user interface 126 allows the designer to define a deformation area directly on the model, and to graphically view the generated weighted deformations determined therefrom. The deformation weight generator 128 takes the deformation area provided through user interface 126 and generates the deformation weights for points on the model for a given deformation. These various elements of the software product 122 variously configure and control the processor 118 to operate in accordance with the method of the present invention. The software product 122, or any elements thereof, may be supplied to the apparatus 100 on CD-ROM, diskette, or any other computer-readable media, for installation and execution thereon. The memory 116 may also include conventional software, such as a three-dimensional modeler 124 for modeling geometric models and associated data. The modeler 124 may be conventional, or in an alternate embodiment, may be modified to incorporate the elements of software product 122 itself. The computer system and apparatus may be implemented on a conventional Silicon Graphics workstation, executing the software product 122 in accordance with the present invention, or any other combination of software or hardware that operates in accordance with the principles of the present invention. It is understood by those of skill in the art of software engineering that the method of the present invention may be implemented in various configurations of a software product having different elements than those identified above.

Figure 2:
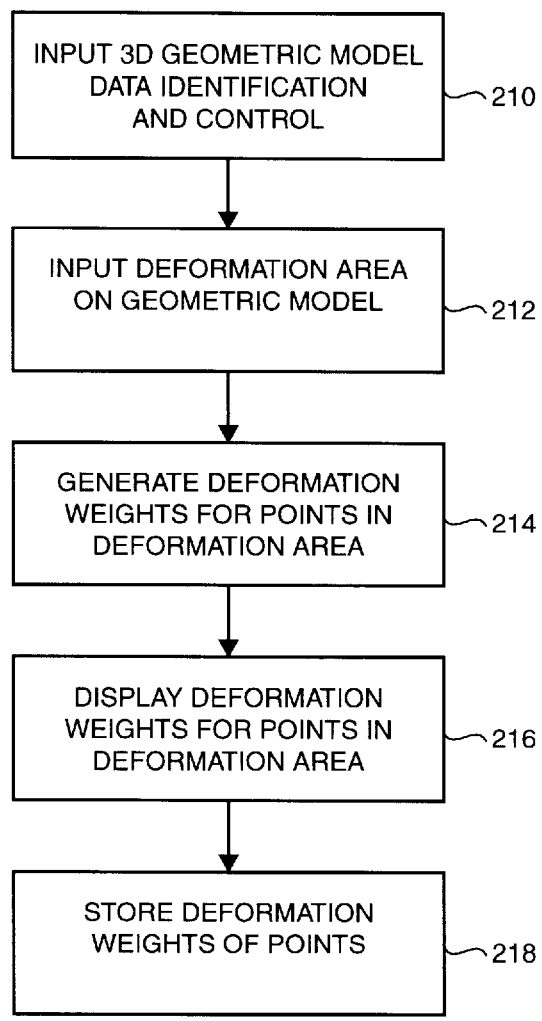
FIG. 2 is a flow diagram for a generalized procedure for generating a weighted deformation in accordance with the present invention.

Referring now to FIG. 2 there is shown a generalized flow diagram of a typical procedure for generating a weighted deformation in accordance with an embodiment of the invention. The geometric model is first created 210, using conventional modeling software 124. Any type of computer-generated model and modeling software may be used with one embodiment of the invention; the format of the model and its deformations and the specifics of the modeling software is not material. Generally, a model is defined by a set of points, each point having an X, Y, and Z coordinate in a 3D coordinate system. These points are used as part of a model representation to define a boundary representation or surface that can be made visible by graphical rendering techniques. The two most common model representations are polygonal meshes and parametric surfaces. Models suitable for use with the present invention include those generated in modeling and animation tools such as Alias/Wavefront's Studio™ or Power Animator™ and Microsoft Corp.'s SOFTIMAGE|3D™. In addition to creating the geometric model, the designer also specifies where the deformation weight output is to be subsequently stored 218 in the database 120.

Using input devices such as the mouse 114 and keyboard 112 and viewed on the display 110, the designer inputs on the model a deformation area subject to a given deformation employing user interface 126. The inputs preferably define the deformation area as including at least one focal region for the deformation, though in some instances this is not required, as further explained below.

The deformation weight generator 128 generates 214 the deformation weights for points in the deformation area. The user interface 126 graphically displays 216 the magnitudes of the generated deformation weights for all points in the deformation area on the display 110 for review by the designer. Lastly, the final deformation weights of points in the deformation area are stored 218 in database 120.

This process, as described, addresses the application of a single deformation. Multiple deformations may be applied concurrently, or serially, by repetition of steps 212, 214, 216 and 218. It is also understood that variations of this procedure can be employed, consistent with the principles of the invention, depending upon the properties of the geometric model and deformations, and designer preferences for the deformation weights output.

Figure 3:
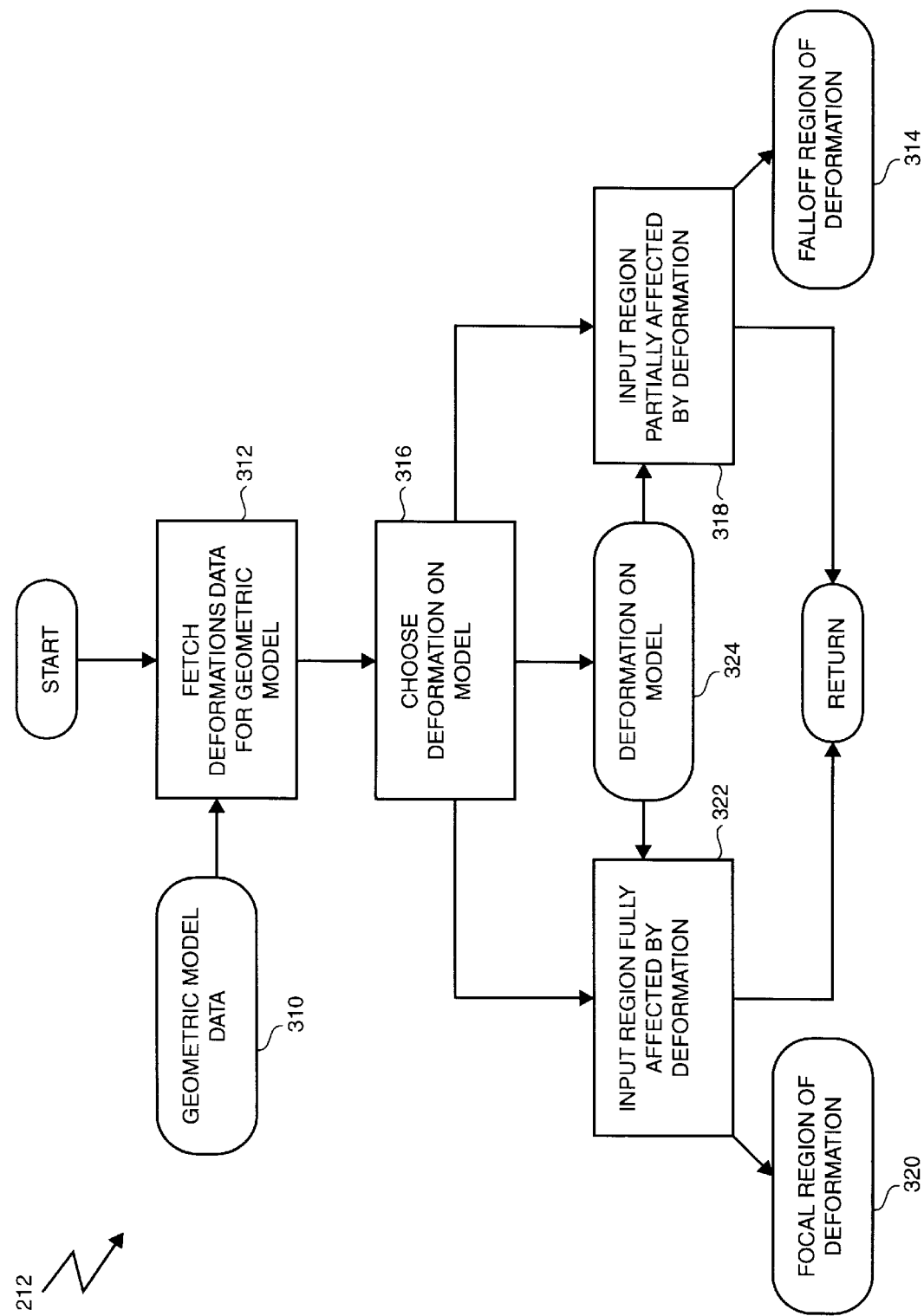
FIG. 3 is a flow diagram of the routine to define a deformation area on the geometric model.

Referring now to FIG. 3 there is shown a flow diagram for inputting 212 a deformation area on the geometric model, as may be performed by the designer with user interface 126. The previously stored geometric model data 310 is retrieved 312 from the database. The designer chooses 316 a deformation on the model with which to work.

The designer marks (322, 318) directly on a graphical display of the geometric model a region fully affected by the deformation and a region partially affected by the deformation. The area fully affected is the focal region 320 of the deformation, and the region partially affected is the falloff region 314 of the deformation, where the strength of the deformation weakens on points further and further away from the focal region. Preferably, a focal region is implicitly bounded by a focal boundary, which separates it from a falloff region, unaffected region, or both. In most cases where the designer defines a falloff region (as will be discussed below this is not necessary), the falloff region is implicitly separated from an unaffected region by a falloff boundary (the boundary between a falloff region and focal region always being deemed a focal boundary). These boundaries need not be separately stored as their own data objects, but rather logically derived from the points constituting the various regions. The regions may be defined directly on the surface of the model, or alternatively for some types on model, on other non-surface points of the model that control the to surface.

Figure 5A:
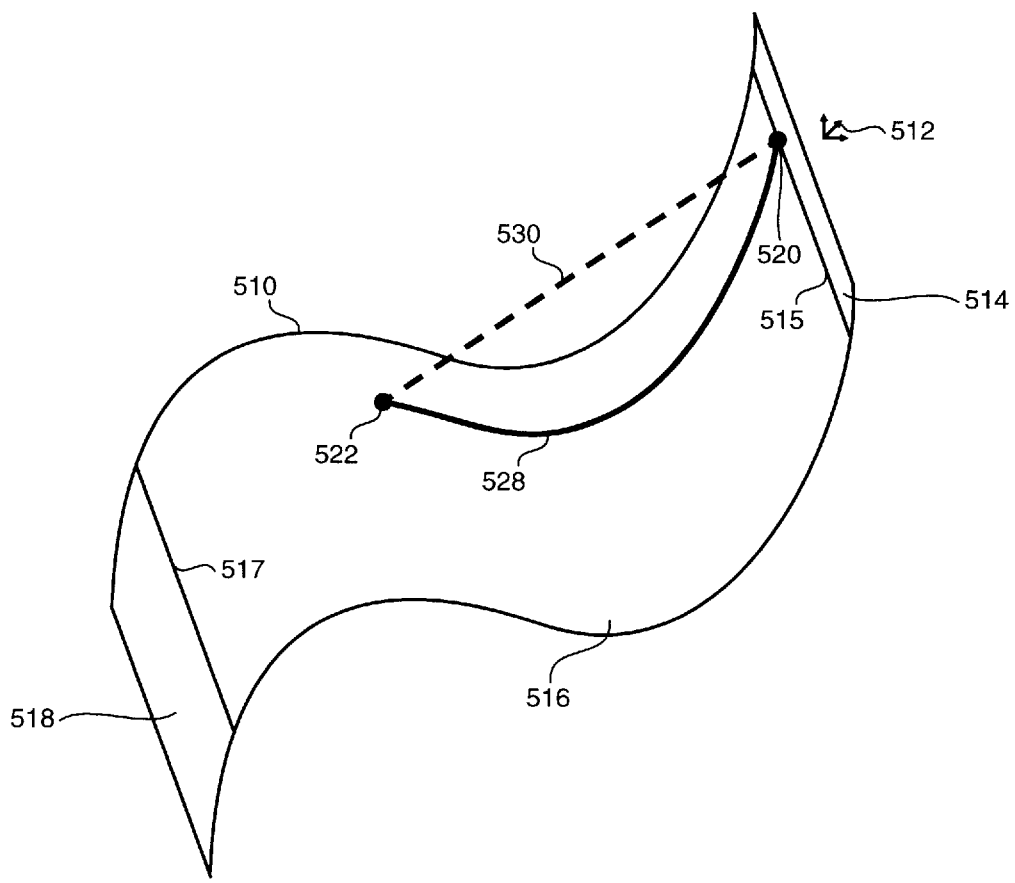
FIG. 5A is a perspective view of a curved portion of model with a defined focal region and falloff region.

FIG. 5A illustrates a curved portion of a surface of a geometric model 510, as may be visually displayed by user interface 126. The surface is defined by a set of points of the model 510, including points 520, and 522. Focal region 514 is shown on the upper portion of the surface. On the lower end of the surface is unaffected region 518. Between the focal region 514 and unaffected region 518 is falloff region 516. Separating focal region 514 and falloff region 516 is focal boundary 515. Separating falloff region 516 from unaffected region 518 is falloff boundary 517. Matrix 512 is used to control the deformation being applied to the surface.

There are no restrictions on the sizes, shapes, arrangements, or numbers of the focal and falloff regions for a deformation, and these regions may be disjointed, abutting, or nested within one another. The order in which the designer inputs the focal and falloff regions for a deformation is not material.

In one embodiment of the invention, the user interface 126 provides several mechanisms with which to mark the focal and falloff regions of the deformations, for example, different drawing and paintbrush tools, and marquee and lasso selection tools. In addition, a primitive can also be used as a marking mechanism, although other marking mechanisms may add to or remove areas of the region initially marked by the primitive. It is understood any marking mechanism may be implemented to define the deformation area.

Figure 4:
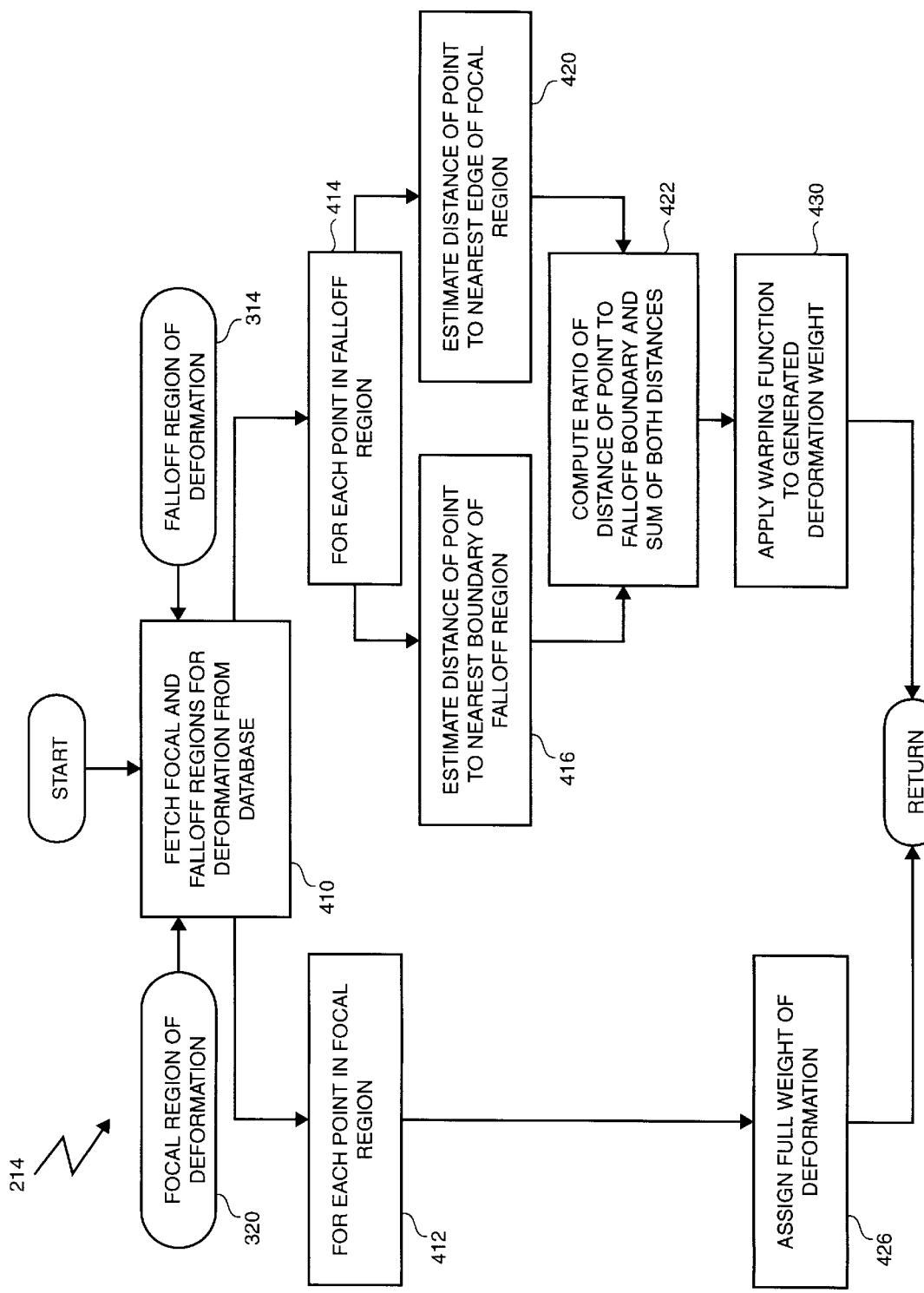
FIG. 4 is a flow diagram of the routine that computes the weights of points on the model that are influenced by a deformation.

Referring now to FIG. 4 there is shown a flow diagram for generating 214 the deformation weights for points in the deformation area, as may be performed by the deformation weight generator 128. The previously input deformation area, in the form of the focal region 320 and falloff region 314, is retrieved 410 from the database. The order in which the weights for the points in the deformation area are determined is not material.

All points in the focal region (412) are assigned 426 a maximum weight 428 for the deformation. The maximum weight is by default set to 100%, though the designer may define any maximum deformation weight for the focal region. This deformation weight is stored with the point data.

Similarly, a deformation weight is determined 414 for each point in the is falloff region. To determine the deformation weight for a point in the falloff region, the distance from the point to a nearest focal boundary of any focal region is estimated 420, and the distance from the point to a nearest falloff boundary is estimated 416. The ratio of the distance to the falloff boundary to the sum of the distances is computed 422 to determine a preliminary deformation weight of the point 428. That is:

$$W = \frac{D_{falloff}}{D_{focal} + D_{falloff}} \quad (1)$$

where W is the deformation weight, $D_{falloff}$ is the estimated distance between the point and a falloff boundary, and $D_{focal}$ is the estimated distance between the point and a focal boundary. The order in which these distances are estimated is not material, but certain ordering strategies provide significant gains in computing efficiency.

One method for estimating distances is to iteratively contract the falloff boundary across the surface of the model, and similarly, iteratively expand the focal boundary across the surface. As these boundaries are contracted or expanded, the distance calculations are made for all points that the boundaries pass through with respect to the original positions of the boundaries. It is advantageous to store both of the distances with the each point when the boundaries contact the point. Since these distances are computed and stored as the boundaries are expanded or grown, there is a natural ordering to the distance computations. When the deformation weight of a point is computed, the point is first tested to determine if the distances have been computed, and if so, the deformation weight is evaluated as the ratio of the stored distances. If one distance has been computed, only the other need be measured.

This deformation weight 428 may be useful for some applications, depending on the nature of the affects desired and the representation of the underlying geometric model. However, in the preferred embodiment, the deformation weight 428 of the point is processed 428 by a warping function so that the range of weights is not a strict linear function of the point's distance to the respective boundaries as given by Eq. 1, above. The warping function keeps the weight value within 0 and 1, yielding a weight between 0% and 100%. In one embodiment, there are several different warping functions available to the designer to control the assignment of weights to points in the falloff region, and the designer may also create a custom warping function.

Figure 6:
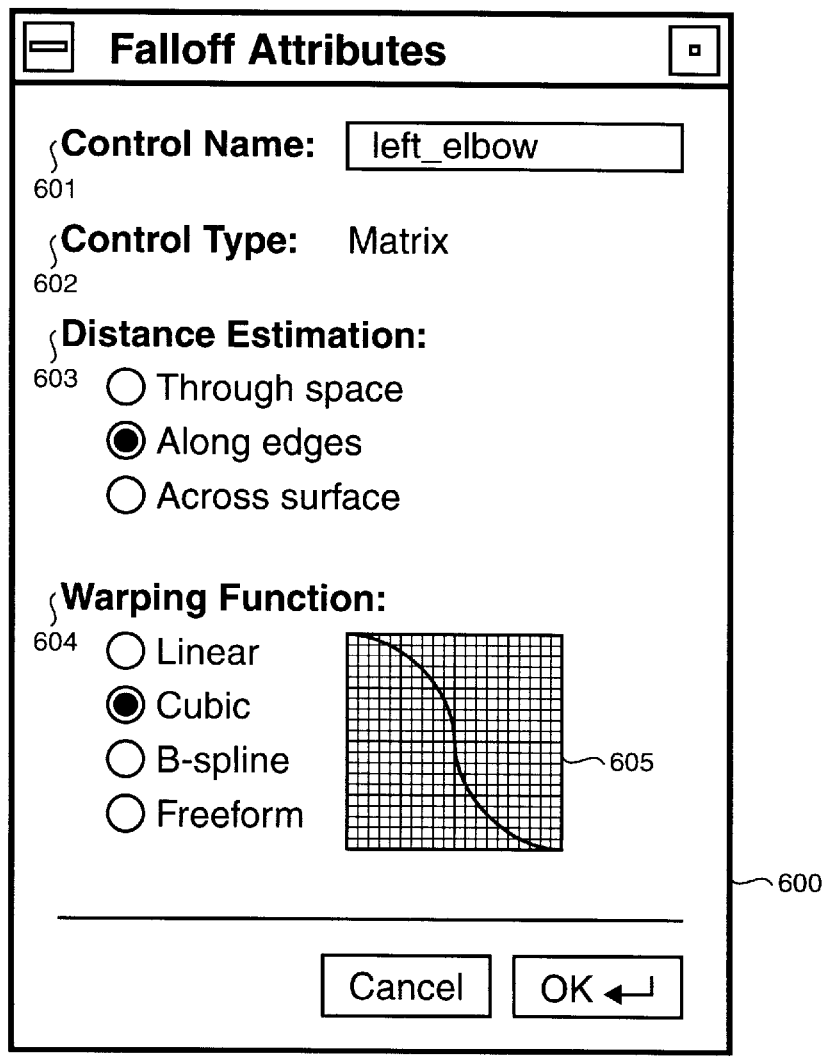
FIG. 6 is a user interface control for defining attributes of the falloff region.

FIG. 6 illustrates a user interface control 600 for defining attributes of a falloff region. The control 600 is provided by user interface 126. The warping function 604 is here easily specified by selection of either linear, cubic, B-spline curve. Additionally the designer may specify a freeform or custom warping function and interactively define the shape of the function on the grid display 605. Control 600 further indicates the type of the deformation control 602, such as matrix, curve, surface, or lattice, for which the deformation weights are being defined.

Deformation weights for points in the falloff region 314 are generated when this routine is completed. In one embodiment, a given deformation weight W is assigned as a percentage with the value $0 \leq W \leq 1$, but it is understood that variations in the units of weights can be employed. For example, scaling factors may be applied to the deformation weights as a user preference.

The distance estimation technique selected is preferably fast enough to provide the feedback on the generated deformation weights while a deformation area is being input by the designer. Several different techniques are used to estimate the distances between the respective boundaries. User interface control 600 provides a convenient mechanism of selecting different estimation methods 603.

In one embodiment, the distance estimation technique employed in 420 and 416 preferably finds the minimum distance from a point in the falloff region to both the focal and unaffected regions. Referring again to FIG. 5A there is shown two basic methods of estimating distances. The estimated distance may be a surface distance 528 measured along the surface between the point and a boundary. Here surface distance 528 tracks the curvature of the surface 510 between point 522 in the falloff region 516 and point 520 on the focal boundary 515. When the surface distance between point 522 is measured to the falloff boundary 517, the ratio of the latter to the sum of distances specifies the deformation weight as function of the surface variations. The use of a surface distance is indicated to the deformation weight generator 128 by selection of "across surface" as the distance estimation method 603 in user interface control 600.

The surface distance may be measured in two ways. The surface distance may be measured without regard to the actual distribution of points in the model and edges between points, so that the expanding and contracting boundaries of the focal and falloff regions cut between points and edges of the model. This approach yields an accurate estimation of the surface distance but is more computationally expensive, particularly for models with a non-uniform distribution of points. Alternatively, the surface distance may be measured by moving the boundaries only along edges between points on the surface, so that the minimum path is measured also a series of edges. This approach is specified by selection of "along edges" as the distance estimation method 603. Using this technique it is preferable to move the boundaries in uniform distance amounts, instead of equal point changes. This is because the non-uniform distribution of points may cause the boundary to advance in uneven increments in different locations. For example, in one region of the model with a high density of points, the boundary may be advanced multiple times, while at the same time at another location of the model with a low density of points, the boundary may not move at all because the spacing between the point is greater than the total distance moved by the boundary in the high density area.

Referring again to FIG. 5a, the distance may be a spatial distance measured directly through space between a point and the respective focal and falloff boundaries. An example of this is spatial distance 530 between point 522 and point 520. A spatial distance is particularly useful where the surface is of low curvature between the boundaries and the point of interest, since a spatial distance then closely approximates a surface distance, and is faster to compute than a surface distance. The use of a spatial distance is indicated to the deformation weight generator 128 by selection of "through space" as the weighting algorithm 603 in user interface control 600. Preferably the same distance estimation technique should be used for both distance estimations, in order to compensate for any estimation errors.

Figure 5B:
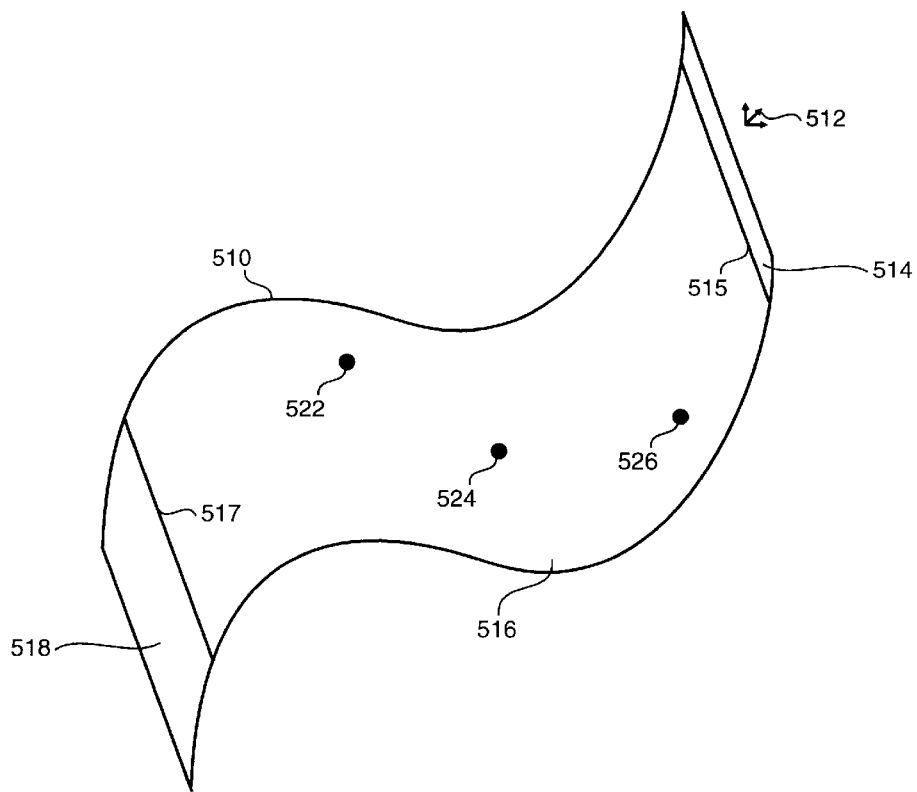
FIGS. 5B and 5D illustrate the curved portion of the model of FIG. 5A with variations in the outlines of the focal and falloff boundaries.
Figure 5C:
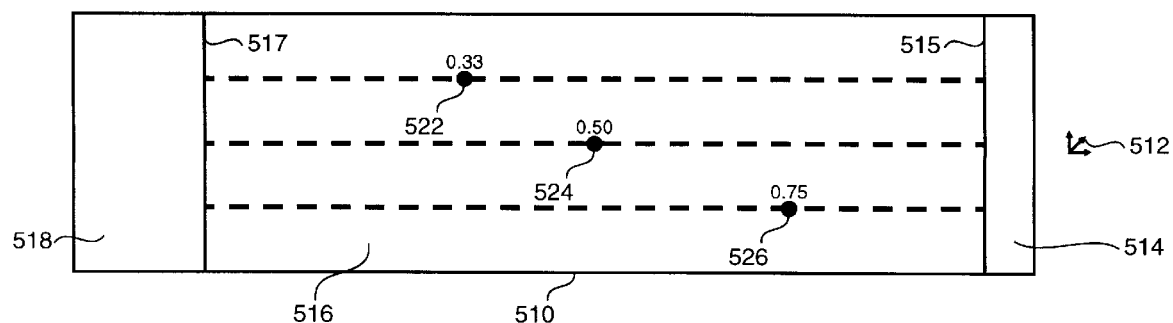
FIGS. 5C and 5E illustrate the distance estimations for the deformation weights of points in the models of FIGS. 5B and 5D, respectively.

In the preferred embodiment, the distance measured in determining the deformation weight is between a point and the closest point on one of the focal and falloff boundaries. FIGS. 5B–5E illustrate the use of this technique. In FIG. 5B there is shown the curved surface of a model 510 with points 522, 524, and 526 at various locations in the falloff region 516. The focal region 514 has a focal boundary 515 that is parallel to the falloff boundary 517 of the falloff region 516. FIG. 5C illustrates a top view of the surface of FIG. 5B that has been "flattened." In FIG. 5C the deformation weight of point 522 is 0.33 since the distance between the point and the falloff boundary 517 is one-third the total distance between the boundaries, when measured as a surface distance. The distances are measured to points nearest on the boundaries, as shown by the dashed lines, which define minimum paths between the points and the boundaries. Point 524 has a deformation weight of 0.50, being equidistant to the focal region 514 and the unaffected region 518, and thus halfway between the region of 100% deformation and 0% deformation. Point 526 has a deformation weight of 0.75 because of its closeness to the focal region 514. These deformation weights are the values resulting from step 422, prior to the application of any warping function.

Figure 5D:
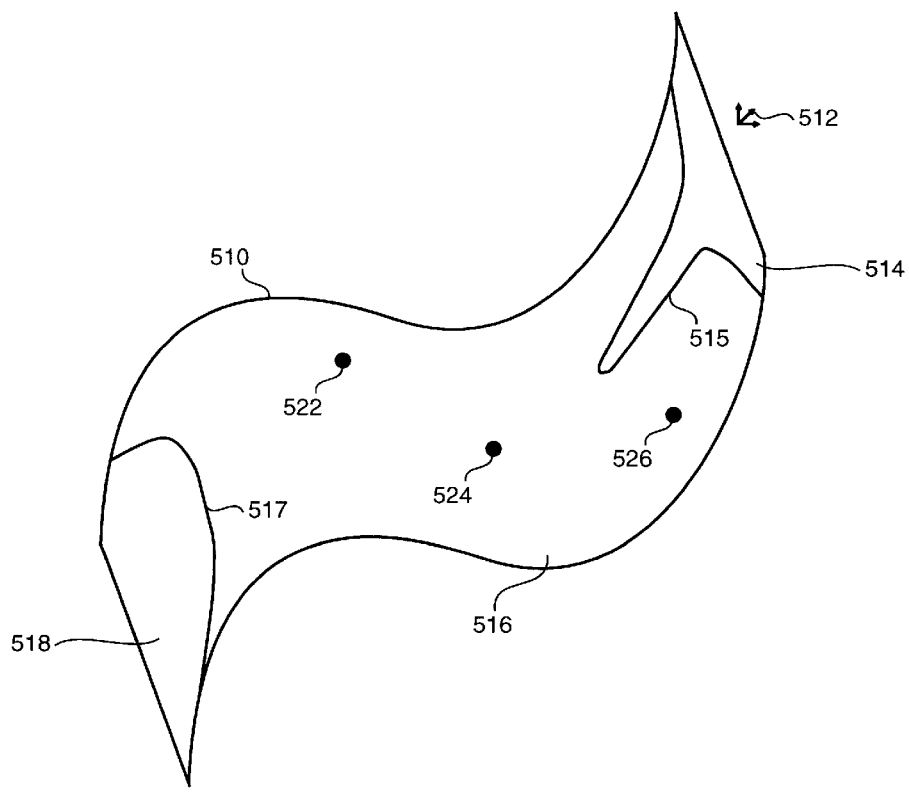

In FIG. 5D, the shapes of the focal 514 and falloff 516 regions have been altered by the designer. Focal region 514 now has a protruding peak into the falloff region 516. The falloff boundary 517 has an approximately parabolic inward deflection. Note that the locations of points 522, 524, and 526 have not changed.

Figure 5E:
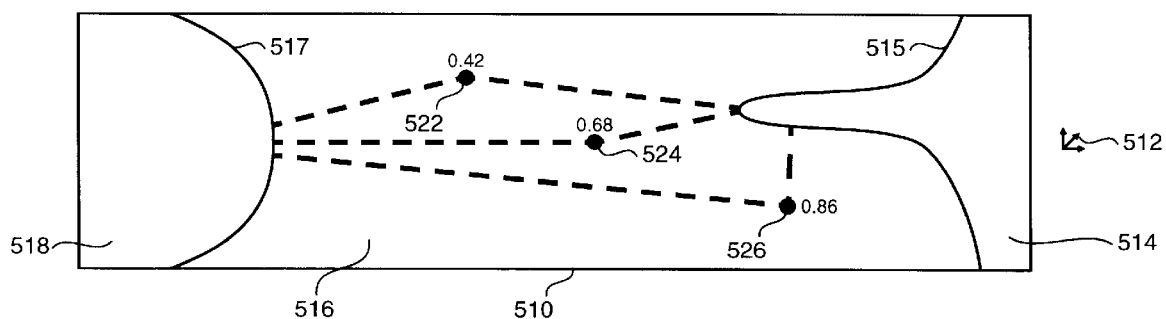

FIG. 5E illustrates a top view of the surface of FIG. 5D, again being flattened to show the surface distances more clearly. Here, point 522 has a deformation weight of 0.42, and point 524 has a deformation weight of 0.68. Both of these are measured from the same closest point on the focal boundary 515, though from different points on the falloff boundary 517. Point 526 has a deformation weight of 0.86 and is measured by its distance to a closest point on the side of the focal boundary 515.

Referring back to FIG. 2, there are several embodiments of the graphical display 216 of the generated deformation weights. When viewing the results of a single generated weighted deformation, the user interface 126 provides the designer with several different graphical display options of the weighted deformations. In one embodiment, focal regions are displayed in one color, and the falloff regions are displayed in a second, distinct color. This allows the designer to quickly determine the shape and extent of each region, independently of the actual deformation weights assigned. To view deformation weight assignments, the deformation weights may be displayed as a shaded view of the model, with variations in shading indicating different deformation weight magnitudes, for example by shading a deformation weight of 0% with the lightest shading, up to shading a deformation weight of 100% with the darkest shading. This allows the designer to immediately perceive the distribution of weights without the clutter of a numerical display. In areas where multiple deformations affect the same area and are blended, there may be a multi-colored representation of the model, with a different color assigned to each deformation, and variable shading in the colors representing the magnitude of each deformation weight. The shading gradations may also be turned off to allow the designer to clearly view where there are areas influenced by multiple deformations. It is understood that other embodiments of graphical displays of weighted deformations exist and can be employed in the invention.

Referring back to FIGS. 3 and 4, if no focal region for a deformation is input 322 (FIG. 3), the point (or set of points) the furthest distance away from the falloff boundary of the unaffected region is inferred as the closest point(s) to the missing focal region. This inferred focal region is used to calculate 420 the distance of a point in the falloff region to a nearest boundary of the focal region. Similarly, if no unaffected region for the deformation exists (for example, if the focal and falloff regions cover the whole model), the point (or set of points) the furthest distance away from the focal region is inferred as the closest point(s) to the missing unaffected region. This region is used to calculate 416 the distance for a point in the falloff region to a nearest boundary of the unaffected region.

If neither focal nor unaffected regions exist for a deformation, the closest point (or set of points) to the deformation control is inferred as the focal boundary of the focal region. In this unusual case, the weights in the falloff region are dependent on the location of the deformation control, but in all other cases, the focal and falloff regions are independent of the location of the controls.

In these situations where the focal and/or unaffected regions are missing, or optionally in any case, the designer may specify deformation weight limits. For example, in the case where the focal region of a deformation is missing, the user can specify the maximal deformation weight of the furthest point from the unaffected region as a weight lower than the default 100%. All other weights in the falloff region would then be computed between 0% and the specified maximal weight. Similarly, if the unaffected region of a deformation is missing, a minimal deformation weight of the furthest point from the focal region can be set to a value higher than the default 0%. All other falloff point deformation weights would then be computed between the specified minimal weight and the maximum deformation weight.

Throughout the entire weighted deformation generation process, the designer may correct deformation weights that do not behave as desired by changing the shape of the focal and falloff regions, the warping function, or the distance estimation method by the various techniques described. If these undesired weights cannot be resolved by these changes for the deformation, other weight correction techniques may be employed. In one embodiment, the designer may enter specific deformation weight offsets to points in the deformation area, for example, by specifying a fixed value to be added to the calculated deformation weights of a set of points in the falloff region. The designer may also enter explicit deformation weight values for individual points.

When an area of the geometric model is influenced by more than one deformation, the designer has several options on how the different deformation weights are blended to create the desired outcome. If the deformations involve displacing the model from one location to another, the different deformation weights for a point may be normalized so that the sum of the deformation weights is equal to 1. If the deformations are local, that is, unaffected areas remain in the same location, the remainder from the sum of the different deformation weights may be factored in as a type of anchor to the original position. It is understood by those of skill in the art of computer graphics that the weighted blending of deformations may be implemented in various ways depending on the nature of the deformations and the geometric model, and the desired outcome.

In summary, the present invention provides an intuitive and powerful mechanism for specifying and generating deformation weights on three dimensional geometric models. Application of a deformation area directly on the model being deformed provides the ability to correctly interpolate deformation weights across any expanse of surface, thereby eliminating the need to manually edit potentially hundreds or thousands of points. Further, definition of the deformation area on the model, as opposed to conventional volumetric type approaches, provides for increased control and accuracy of the deformation, producing more realistic deformations.

I claim:

1. A computer implemented method of generating a weighted deformation of a three-dimensional geometric model having a plurality of points, the method comprising:
    defining a deformation area on a surface of the model responsive to an input selecting points of the model; and,
    determining for each point within the deformation area a deformation weight as
        a function of
        a first distance of the point to a focal boundary on the surface of the model of a first region of the deformation area where a maximum deformation is applied and
        a second distance of the point to a falloff boundary on the surface of the model of a second region of the deformation area where a minimum deformation is applied.

2. The method of claim 1, wherein the deformation area on the surface of the model
    is defined responsive to the input selecting points on the surface of the model.

3. A computer implemented method of generating a weighted deformation of a three-dimensional geometric model having a plurality of points, the method comprising:
    defining a deformation area on a surface of the model responsive to an input selecting points of the model;
    creating a focal region containing a plurality of points responsive to a focal boundary of the deformation area;
    creating an unaffected region containing a plurality of points responsive to a falloff boundary of the deformation area;
    creating a falloff region including points of the model not in the focal region or the unaffected region and;
    determining for each point within the deformation area a deformation weight as a function of a distance of the point to the focal boundary and a distance of the point to the falloff boundary.

4. The method of claim 3, wherein determining for each point within the deformation area a deformation weight comprises:
    assigning to each point in the focal region a maximum deformation weight; and,
    determining for each point within the falloff region a deformation weight as a function of a distance of the point to the focal region, and a distance of the point to the unaffected region.

5. The method of claim 1, further comprising:
    receiving a user input specifying a maximum deformation weight for points in the first region.

6. The method of claim 1, further comprising:
    receiving a user input specifying a minimum deformation weight for points in the second region.

7. The method of claim 3, wherein determining for each point within the deformation area a deformation weight comprises:
    determining a first spatial distance between the point and the focal region;
    determining a second spatial distance between the point and the unaffected region;
    determining the deformation weight as a function of the first and second distances.

8. The method of claim 7, wherein determining the deformation weight as a function of the first and second distances comprises:
    determining the deformation weight as a function of a ratio of the second distance to a sum of the first and second distances.

9. The method of claim 1, wherein determining for each point within the deformation area a deformation weight comprises:
    determining the deformation weight as a function of a ratio of the first distance to a sum of the first distance of the point and the second distance of the point.

10. The method of claim 1, wherein the first distance is computed by a direct minimum path across the surface between the point and the focal boundary.

11. The method of claim 1, wherein the first region is a focal region, and wherein:
    defining a deformation area on a surface of the model comprises:
        receiving an input defining a falloff region directly on points of the model, the falloff region having the falloff boundary and including a plurality of points; and,
    determining for each point within the deformation area a deformation weight comprises:
        inferring the focal region in the deformation area as a set of points furthest away from the falloff boundary;
        assigning to each point in the focal region a maximum deformation weight; and,
        determining for each point within the falloff region a deformation weight as a function of a distance of the point to the focal region, and a distance of the point to the falloff boundary.

12. The method of claim 1, wherein defining a deformation area on a surface of the model comprises:
    receiving an input defining a deformation control relative to the model; and,
    determining for each point within the deformation area a deformation weight comprises:
        inferring the focal boundary in the deformation area as a set of points closest to the deformation control;

inferring the falloff boundary in the deformation area as a set of points farthest from the focal boundary; and determining for points between the focal boundary and the falloff boundary a deformation weight as a function of a distance of the point to the focal boundary, and a distance of the point to the falloff boundary.

13. The method of claim 1, wherein the first region is a focal region, and wherein:

defining a deformation area on a surface of the model comprises:

receiving an input defining the focal region directly on points of the model, the focal region having the focal boundary and including a plurality of points; and, determining for each point within the deformation area a deformation weight comprises:

inferring the falloff boundary for the deformation area as a set of points furthest away from the focal boundary, a falloff region being between the falloff boundary and the focal boundary;

assigning to each point in the focal region a maximum deformation weight; and, determining for each point within the falloff region a deformation weight as a function of a distance of the point to the focal region, and a distance of the point to the falloff boundary.

14. The method of claim 1, further comprising:

displaying each point in the deformation area with a shading representative of a magnitude of the deformation weight.

15. A method for generating a weighted deformation of a three-dimensional geometric model having a plurality of points, comprising:

receiving a first input defining a focal region directly on points on a surface of the model, the focal region having at least one focal boundary on the surface of the model and including a first plurality of points;

receiving a second input defining a falloff region directly on points on the surface of the model, the falloff region having a falloff boundary on the surface of the model and including a second plurality of points;

assigning to each point in the focal region a maximum deformation weight; and, determining for each point within the falloff region a deformation weight as a function of a distance of the point to the at least one focal boundary and to the falloff boundary.

16. A computer program product stored on a computer readable memory and executable by a processor, for generating a weighted deformation of a three-dimensional geometric model having a plurality of points, the program product comprising:

a deformation weight generator executable by the processor to receive a user input specifying a deformation area directly on points on a surface of the model, and to determine for each point within the deformation area a deformation weight as a function of:

a first distance of the point to a focal boundary on the surface of the model of a first region of the deformation area where a maximum deformation is applied and a second distance of the point to a falloff boundary on the surface of the model of a second region of the deformation area where a minimum deformation is applied.

17. A computer implemented method of generating a weighted deformation of a three-dimensional geometric model having a plurality of points, the method comprising:

defining a deformation area on a surface of the model responsive to an input selecting points of the model; and, determining for a point within the deformation area a deformation weight as a function of the relationship of the point to other points in the deformation area.

* * * * *

UNITED STATES PATENT AND TRADEMARK OFFICE
CERTIFICATE OF CORRECTION

PATENT NO. : 5,892,691
DATED : April 6, 1999
INVENTOR(S) : Barry M. Fowler

It is certified that error appears in the above-identified patent and that said Letters Patent is hereby corrected as shown below:

<u>Title page,</u>
Item [73], delete "Reel/Frame 8218/0138"

Signed and Sealed this

Eleventh Day of June, 2002

Attest:

Attesting Officer

JAMES E. ROGAN
*Director of the United States Patent and Trademark Office*